(12) United States Patent
Ronen et al.

(10) Patent No.: US 7,458,069 B2
(45) Date of Patent: *Nov. 25, 2008

(54) SYSTEM AND METHOD FOR FUSING INSTRUCTIONS

(75) Inventors: Ronny Ronen, Haifa (IL); Alexander Peleg, Haifa (IL); Nathaniel Hoffman, Las Vegas, NV (US)

(73) Assignee: Intel Corporation, Santa Clara, CA (US)

( * ) Notice: Subject to any disclaimer, the term of this patent is extended or adjusted under 35 U.S.C. 154(b) by 708 days.

This patent is subject to a terminal disclaimer.

(21) Appl. No.: 10/752,875

(22) Filed: Jan. 6, 2004

(65) Prior Publication Data

US 2004/0139429 A1 Jul. 15, 2004

Related U.S. Application Data

(63) Continuation of application No. 09/752,233, filed on Dec. 29, 2000, now Pat. No. 6,675,376.

(51) Int. Cl.
*G06F 9/45* (2006.01)

(52) U.S. Cl. .................. 717/151; 717/152; 717/159

(58) Field of Classification Search .............. None
See application file for complete search history.

(56) References Cited

U.S. PATENT DOCUMENTS

| | | | | |
|---|---|---|---|---|
| 5,230,050 A | * | 7/1993 | Iitsuka et al. ........... | 717/145 |
| 5,392,228 A | | 2/1995 | Burgess et al. ......... | 364/715.04 |
| 5,850,552 A | * | 12/1998 | Odani et al. ............. | 717/156 |
| 5,903,761 A | | 5/1999 | Tyma ...................... | 395/709 |
| 5,957,997 A | | 9/1999 | Olson et al. ............. | 708/205 |
| 6,006,324 A | | 12/1999 | Tran et al. ............... | 712/204 |
| 6,018,799 A | | 1/2000 | Wallace et al. ........ | 712/300 |

(Continued)

OTHER PUBLICATIONS

Perng-Yi Ma, TRW Systems Group and T.G. Lewis, Oregon State University, "Design of a Machine-Independent Optimizing System for Emulator Development," *ACM Transactions on Programming Languages and Systems*, vol. 2, No. 2, Apr. 1980, pp. 239-262.

(Continued)

*Primary Examiner*—Chuck O Kendall
(74) *Attorney, Agent, or Firm*—Kenyon & Kenyon LLP

(57) ABSTRACT

A system and method for producing a fused instruction is described. In one embodiment, a first instruction and a second instruction that are both simple instructions (e.g., perform only one operation) and are dependent are fused together to create the fused instruction. The fused instruction has an opcode that represents the operation performed by the first instruction and the operation performed by the second instruction. The fused instruction has three source operands and one destination operand. Two of the three source operands are the two source operands of the first instruction, and the third source operand is the source operand of the second instruction that is not the destination operand of the first instruction. The destination operand of the fused instruction is the destination operand of the second instruction. An execution unit that can execute a fused instruction in one clock cycle is also disclosed. In one embodiment, the execution unit has two arithmetic logic units ("ALUs"), each of the ALUs performs one of the two operations of the fused instruction. The result of the first ALU is input into the second ALU to produce the desired result.

28 Claims, 4 Drawing Sheets

U.S. PATENT DOCUMENTS

| | | | |
|---|---|---|---|
| 6,151,618 A | 11/2000 | Wahbe et al. | 709/1 |
| 6,247,113 B1 | 6/2001 | Jaggar | 712/200 |
| 6,282,634 B1 | 8/2001 | Hinds et al. | 712/210 |
| 6,742,110 B2 * | 5/2004 | Djafarian et al. | 712/215 |

OTHER PUBLICATIONS

G. J. Lipovski and Paul Vaughan, Department of Electrical and Computer Engineering, University of Texas, Austin, Texas, "A Fetch-And-Op Implementation for Parallel Computers," CH2545-2/88/0000/0384$01.00 © 1988 *IEEE*, pp. 384-392.

Guy Argo, Computing Science Department, The University, Glasgow G12 8QQ, United Kingdom, "Improving the Three Instruction Machine," © 1989 *ACM* 0-89791-328-0/89/0009/0100 $1.50, pp. 100-115.

Soo-Mook Moon and Kemal Ebcioğlu, IBM Thomas J. Watson Research Center, P.O. Box 218, Yorktown Heights, NY 10598, "An Efficient Resource-Constrained Global Scheduling Technique for Superscalar and VLIW processors," 0-8186-3175-9/92 $3.00 © 1992 *IEEE*, pp. 55-71.

* cited by examiner

Op-Code scr1, scr2, dst

Add r1, r2, r3 ⇒ r3=r1+r2

Op1 & Op2 scr1, scr2, scr3, dst ⇒
Op1 scr1, scr2, t1
Op2 t1, scr3, dst

Add & Add r1, r2, r3, r4 ⇒ Add r1, r2, t1
Add t1, r3, r4

SYSTEM AND METHOD FOR FUSING INSTRUCTIONS

RELATED APPLICATIONS

This application is a Continuation of U.S. Ser. No. 09/752,233 filed on Dec. 29, 2000 now U.S. Pat. No 6,675,376.

BACKGROUND OF THE INVENTION

I. Field of the Invention

This invention relates generally to computer technology, and more particularly, to improving processor performance in a computer system.

II. Background Information

Developers are continually trying to improve processor performance and program execution time. Processor performance and program execution time can be improved using hardware and software techniques. Hardware techniques include pipelining where the fetch, decode, and execute logic stages are overlapped such that the processor operates on several instructions simultaneously. Software techniques include having a compiler optimize the program code. Normally, passes in the compiler transform programs written in a high-level language (e.g., the high-level programming language may be the "C" computer programming language) into progressively lower-level representations, eventually reaching the instruction set. The instruction set is the collection of different instructions that the processor can execute (e.g., the Intel Architecture 32-bit ("IA-32") instruction set from Intel Corporation).

An optimizing compiler is a compiler that analyzes its output to produce a more efficient (smaller or faster) instruction set. The optimizing compiler may use multiple passes to convert high-level code to low-level code (the instruction set). One way that the optimizing compiler improves program execution time is by reducing the code footprint (number of instructions generated into assembly language from the high-level program code). Reducing the code footprint improves program execution time since the program code has fewer instructions, and thus fewer instructions are fetched from a memory unit in the fetch stage (the memory unit's speed is slower than the processor's speed) and fewer instruction are decoded in the decode stage.

Reducing the code footprint also improves processor performance as a cache memory is better utilized. Almost all modern processors use cache memory. Cache memory is a special memory subsystem in which frequently used data values are duplicated for quick access. Cache memory is useful when main memory accesses are slow compared with processor speed, because cache memory is faster than main memory. Cache memory has to be efficiently utilized in order to obtain a high ratio of "hits" (e.g., the data is found in the cache memory and thus access to the main memory is avoided) to "misses" (e.g., the main memory is accessed in order to obtain the data). Since a cache miss results in additional time to retrieve the data into the cache, processing time is lost waiting for this data to arrive when a cache miss occurs. An instruction cache is cache memory that stores instructions fetched from main memory. Reducing the code footprint allows more of the instructions that make up the program code to be stored in the instruction cache, thus increasing the likelihood of a cache hit and the resulting increase in processor performance. Other means of instruction storage can benefit from code footprint reduction. For example, a trace cache stores instructions that have already been executed. By reducing the code footprint, the number of executed instructions stored in the trace cache increases and thus increases the likelihood of cache hits and the resulting increase in processor performance.

In a pipeline implementation, the bottleneck tends to be feeding an execution unit (the fetch and decode stages feed the execution unit) rather than executing the instructions themselves (this occurs in the execution stage). If two or more instructions are packed into the storage space of a single instruction, then multiple instructions can be fetched and decoded in the time that it takes to fetch and decode a single instruction resulting in the execution unit being fed at a faster rate and thereby improving the processor performance.

A clock cycle determines how quickly the processor can execute instructions and is used to synchronize the activities of various components of a computer system. The length of the clock cycle is determined by the time required for the slowest instruction to execute. Typically, the execution unit (in the execution stage) executes one instruction per clock cycle (i.e., performs one operation per clock cycle). However, because the clock cycle is tailored for the slowest instruction, many of the instructions finish executing long before completion of the clock cycle. Because the clock cycle is tailored toward the slowest instruction, one instruction performing two operations or two instructions (each instruction performing only one operation) may be executed in one clock cycle if a specialized execution unit is available that can execute both operations simultaneously. If the specialized execution unit is employed, then upon decoding one or more instructions that can benefit from the specialized execution unit, those instructions can be tagged for execution on the specialized execution unit.

For the foregoing reasons, there is a need to combine instructions whenever possible in order to minimize the program size and thus improve processor performance and program execution time. There is a also a need for a specialized execution unit that can process two operations in one clock cycle.

DETAILED DESCRIPTION

Figure 1:
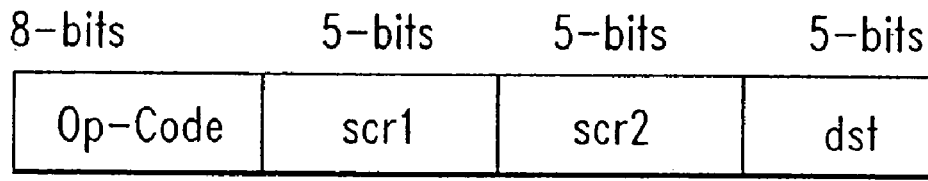
FIG. 1 shows a format of a thirty-two bit instruction.

A program is composed of a sequence of instructions that perform a particular function. The program may be stored on, for example, a main memory or a hard disk. The main memory (or the random access memory ("RAM")), is the main general-purpose storage region to which the processor has direct access. The data stored in main memory is volatile. The hard disk magnetically stores data and the data stored here is static. The program is executed by having a processor fetch the instructions from, for example, the main memory and executing those instructions.

Some of the instructions in the program are simple dependent instructions. A simple instruction, as used herein, is an instruction that performs a single atomic operation. Examples of simple instructions include the add, subtract, shift, load, and store instructions. A dependent instruction, as used herein, is an instruction that has a source operand that is the destination operand of another instruction. An example of a dependent instruction is: add r1, r2, r3 (i.e., r3<-r1+r2) where another instruction uses the r1 operand or the r2 operand as destination operands. Simple dependent instructions, as used herein, are instructions that perform a single atomic operation and have a source operand that is the destination operand of another instruction. The operand is the object of the computer instruction and may be the names of registers. The source operands are the operands whose values are operated on to produce a result. The destination operand stores the result of the operation.

Two instructions that are simple and dependent may be fused together to form one instruction. The fusing of the two simple, dependent instructions result in a fused instruction. The fused instruction includes an operation code ("opcode") that represents both the operation performed by the first instruction and the operation performed by the second instruction. The opcode is the portion of the machine language or assembly language that specifies the type of instruction and the structure of the data on which it operates. The fused opcode specifies two operations—a first operation performed by a first instruction and a second operation performed by a second instruction given that the first instruction and the second instruction are simple, dependent instructions. The "M" first operations and the "N" second operations are represented by M*N fused opcodes resulting in M*N different fused instructions (the "*" represents the multiplication operation).

Because the two instructions are dependent, the number of operands used by the fused instruction is less than the number of operands used by a straight combination of the first instruction and the second instruction. For example, if the first instruction has three operands (e.g., two source operands and one destination operand) and the second instruction has three operands, then the straight combination of the first and second instructions would use a total of six operands. However, if the first instruction and the second instruction are simple dependent instructions, then by taking advantage of this relationship, the fused instruction uses only four operands—three source operands and one destination operand. The source operands are the two source operands of the first instruction and the source operand of the second instruction that is not the destination operand of the first instruction. The destination operand of the fused instruction is the destination operand of the second instruction. Here, the single fused instruction replaces the two simple, dependent instructions leading to a smaller code footprint. The code footprint is the number of assembly instructions generated by the source code of the program.

Reducing the number of instructions in the program (i.e., reducing the code footprint) by fusing simple dependent instructions provides, among others, the following advantages that result in improved processor performance:

(1) the instruction cache is better utilized resulting in a greater cache hit ratio and thus improved processor performance as more of the instructions in the program reside in the cache (i.e., if two instructions rather than one instruction reside in a cache line then more of the program's instructions are in the cache thus resulting, most likely, in increased processor performance);

(2) faster decoding of instructions because when decoding a fused instruction, two instructions are decoded in the time that it takes to decode a single instruction;

(3) the main contributor to decreased computer throughput is from not adequately feeding the execution units but if the computer is decoding instructions at a faster rate, then the execution units are fed at the faster rate thus improving processor performance; and (4) at execution time, if the fused instruction is separated into two different operations (i.e., one operation representing the first instruction and a second operation representing the second instruction), then two separate clock cycles are used to execute the two operations since the two operations are executed by separate execution units. A specialized execution unit, however, may be created that can process both operations of the fused instruction in one clock cycle. If this specialized execution unit is employed, a decode unit may also be used that, upon decoding the fused instruction, notifies the specialized execution unit that a suitable instruction for processing by the specialized execution unit has been decoded and this instruction may be tagged for execution on the specialized execution unit that will perform both operations in one clock cycle.

FIG. 1 shows a format of a typical thirty-two bit instruction. In this instruction format, the opcode specifies the operation to be performed, the data type, and the operand count. This instruction has three operands—two source operands (designated "src1" and "src2") and one destination operand (designated "dst"). The operation specified by the opcode is performed on the source operands and the result is stored in the destination operand. An example of a thirty-two bit instruction in this format is "add r1, r2, r3" where the contents of register r1 and register r2 are added together and the result stored in register r3. In this format, the opcode is a single byte. The opcode is not limited to a specific number of bits but tends to be one byte because a byte can be easily extracted from the instruction. Assuming that the architecture has thirty-two registers, each of the three operands use five-bits in order to address the thirty-two different registers available. The opcode and the three operands use a total of twenty-three bits, and the remaining nine bits of the thirty-two bit instruction are used to distinguish among various instruction groups.

Figure 2:
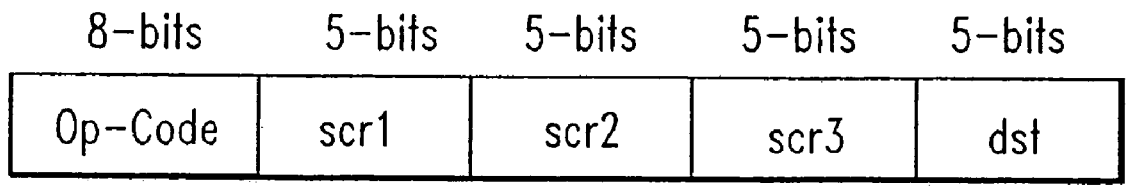
FIG. 2 shows a format of a thirty-two bit fused instruction according to one embodiment of the present invention.

FIG. 2 shows a format of a thirty-two bit fused instruction according to one embodiment of the present invention. In this embodiment, a fused opcode specifies the two operations to be performed, the data type, and the operand count. The two operations specified by the fused opcode are the first operation performed by the first instruction and the second operation performed by the second instruction given that the first instruction and the second instruction are simple, dependent instructions that are fused together to form the fused instruction. In this embodiment, "M" first operations and "N" second operations are specified by "M*N" different fused opcodes (i.e., "M*N" different fused instructions). In FIG. 2, because the opcode for the fused instruction is specified by eight bits, those eight bits can specify 256 different fused opcodes where there are $2^M$ first operations and $2^{8-M}$ second operations and where M is less than or equal to eight. As explained in greater detail below, if the second instruction is non-commutative, then two separate fused instructions (the two instructions having different opcodes) are used to properly apply the source operands of the fused instructions in order to obtain the desired result.

The fused instruction has four operands—three source operands (designated "src1", "src2", and "src3") and one destination operand (designated "dst"). The example in FIG. 2 shows that the fused instruction "op1 & op2 src1, src2, src3, dst" is equivalent to the following two simple dependent instructions: "op1 src1, src2, t1" and "op2 t1, src3, dst". Here, the source the fused instruction are the source operands of the first instruction (src1 and src2) and the source operand of the second instruction that is not the destination operand of the first instruction (src3). The destination operand of the fused instruction is the destination operand of the second instruction. A temporary register, t1, stores the result of the first instruction and this register is used as a source operand by the second instruction. The temporary register t1 represents the dependency between the first instruction and the second instruction and allows the number of operands used by the fused instruction to be four rather than six.

In an alternative embodiment, the temporary register t1 is not used since the destination operand of the first instruction only exists for use by the second instruction and thus the destination operand of the first instruction is not stored anywhere (e.g., not stored in temporary register t1).

In FIG. 2, an example is shown where the fused instruction "add & add r1, r2, r3, r4" is equivalent to the two simple dependent instructions "add r1, r2, t1" and "add t1, r3, r4". In this example, the contents of register r1 is added to the contents of register r2 and the result is stored in the temporary register t1. Then, the contents of temporary register t1 is added to register r3 and the result is stored in register r4. The temporary register t1 provides the dependency between the first instruction and the second instruction such that the fused instruction uses only four registers rather than six registers. In this embodiment, the opcode is a single byte. The opcode is not limited to a specific number of bits but tends to be one byte because a byte can be easily extracted from the instruction. With a one byte opcode, two hundred and fifty six different operations can be specified by the opcode. For example, the op-code for two add operations ("add & add") may be designated "0000 0000", and the op-code for an add operation and a subtract operation may be designated "0000 0001". Assuming that the architecture has thirty-two registers, each of the three source operands and the destination operand uses five-bits in order to address the thirty-two different registers available. Therefore, twenty of the thirty-two bits in the instruction are used by the three source operands and the destination operand. The fused op-code and the four operands use a total of twenty-eight bits and the remaining four bits of the thirty-two bit instruction are used to distinguish among various instruction groups.

An optimizing compiler or a user, using for example a code development tool, may produce the fused instructions. A fused instruction generator of the optimizing compiler analyzes the instructions to find simple, dependent instructions. If two simple, dependent instructions are found, then those two instructions are fused to create one fused instruction and the two simple, dependent instructions are replaced in the program with the fused instruction. The fused instruction generator continues performing this analysis until all simple, dependent instructions are fused together. In addition, the user may manually analyze the program instructions (using, for example, a code development tool) and upon encountering two simple, dependent instructions, replaces those two instructions with the fused instruction.

Figure 3:
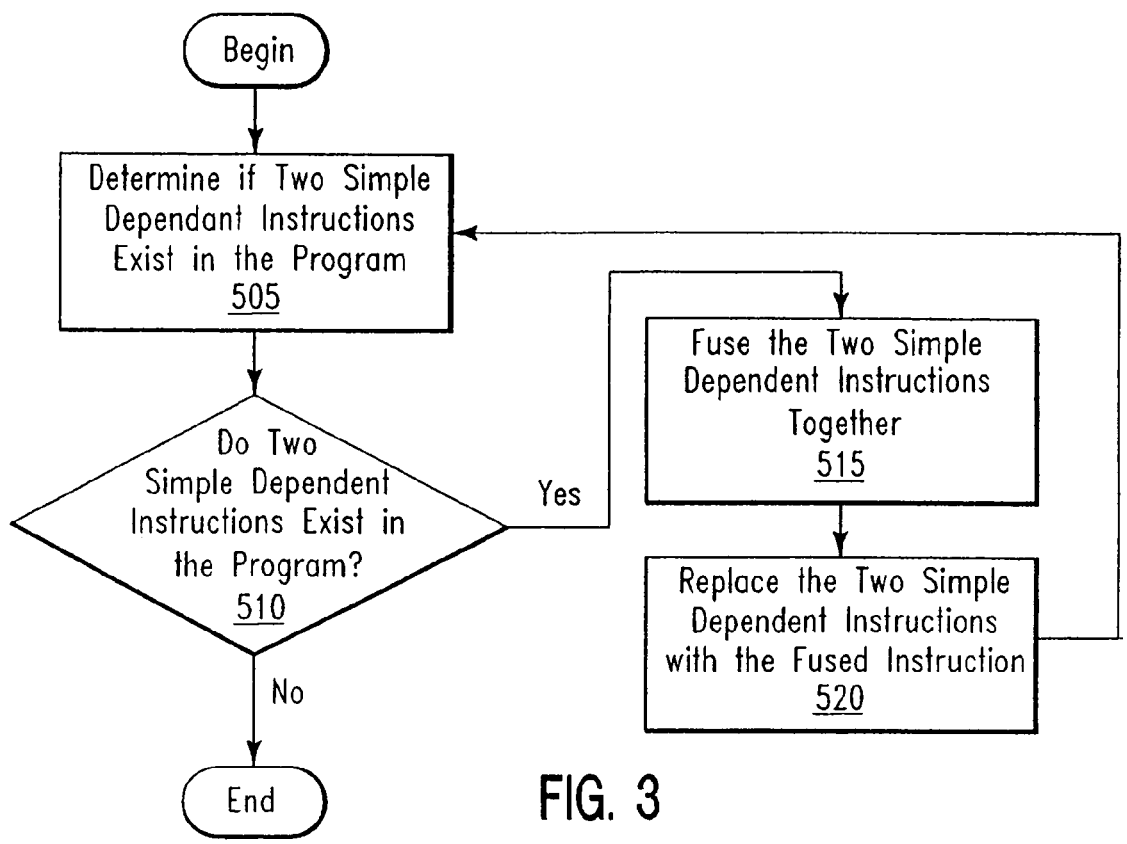
FIG. 3 shows a flowchart describing the process of fusing instructions according to one embodiment of the present invention.

FIG. 3 shows a flowchart describing the process for fusing instructions according to one embodiment of the present invention. In block 505, the program is analyzed to find two simple dependent instructions. In decision block 510, it is determined if two simple dependent instructions exist in the program. If two simple dependent instructions do not exist in the program, then this process for fusing instructions is completed. If two simple dependent instructions are found, then in block 515, the two simple dependent instructions are fused together to produce the fused instruction. The details of fusing the two instructions together are provided in FIG. 4 below. In block 520, the two simple dependent instructions in the program are replaced with the fused instruction. This process then returns to block 505 to again analyze the program to determine if more simple dependent instructions exist in the program that can be fused together. This process repeats this loop until all simple dependent instructions in the program are fused together. The blocks, as described above, for this process can be performed by either the fused instruction generator or performed manually by the user.

Figure 4:
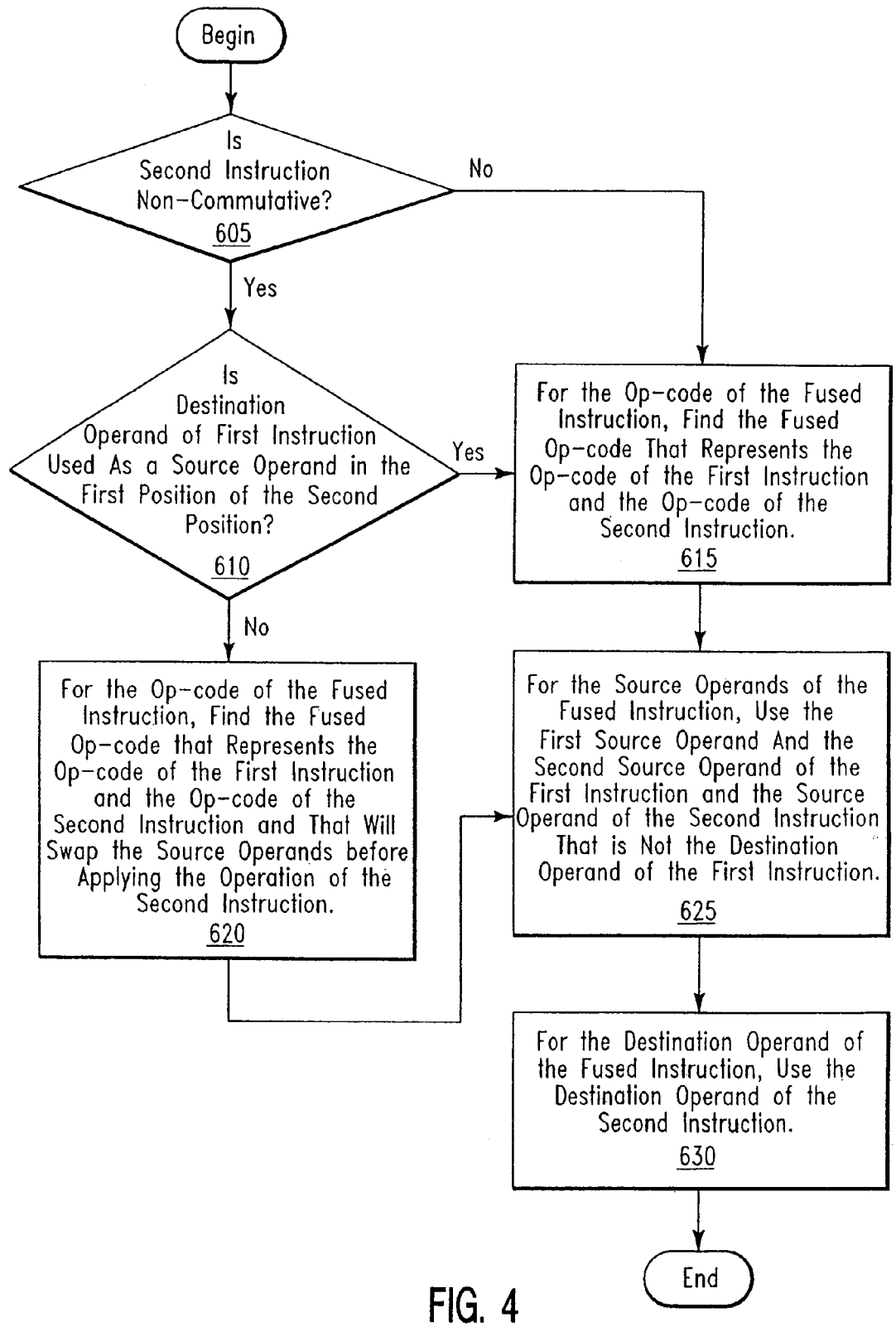
FIG. 4 shows a flowchart describing the process of fusing two simple dependent instructions together to form the fused instruction according to one embodiment of the present invention.

FIG. 4 shows a flowchart describing the process of fusing two simple dependent instructions together to form the fused instruction according to one embodiment of the present invention. FIG. 4 elaborates on block 515 of FIG. 3. In this embodiment, in order to fuse two simple dependent instructions, in conditional block 605, it is determined if the second instruction is non-commutative. The second instruction is non-commutative if the order of applying the source operands matters. For example, with the add instruction, the same result occurs without regard to the order of the two source operands (e.g., if a first source operand has the value four and the second source operand has the value five then the result is nine whether or not the first source operand is added to the second source operand or vice versa). With non-commutative instructions, on the other hand, the order of the source operands does matter, i.e., applying the source operands in a different order produces different results. Non-commutative instructions include the subtract and divide instructions. For example, with the subtract instruction (i.e., the opcode of the subtract instruction performs the subtract operation), the order of the source operands does matter producing different results depending on the order, i.e., using the values given above, the first source operand minus the second source operand equals negative one and the second source operand minus the first source operand equals positive one.

When the second operation of the fused opcode is non-commutative, then two different opcodes are used to properly apply the source operands in order to obtain the desired result. For example, if the first instruction is "add r1, r2, r3" and the second instruction is "sub r3, r4, dst" then the fused instruction is "add & sub r1, r2, r4, dst", However, the fused instruction is again "add & sub r1, r2, r4, dst" even if the second instruction is "sub r4, r3, dst" rather than "sub r3, r4, dst". Thus, if the second instruction is non-commutative, then the order of the source operands are considered in order to produce the correct result.

The first instruction and the second instruction that are fused together are simple dependent instructions and the dependency is exploited to minimize the number of operands in the fused instruction, however, this minimization results in loss of control of the source operands of the second operation of the fused instruction. Thus, if the second operation is not commutative, then two different opcodes are used to properly manipulate the source operands to produce the appropriate result. For example, the opcode "0000 0001" may represent the fused operation "add & sub1" and for this opcode, the operands may be manipulated in the following order: "add r1, r2, t1; sub t1, r4, dst" where t1 is a temporary register that is discarded after use. On the other hand, the opcode "0000 0010" may represent the fused operation "add & sub2" and the source operands may be swapped before performing the subtract operation of "add & sub2" resulting in the following order of applying the operands: "add r1, r2, t1; sub r4, t1, dst". The compiler or the user performing the fused instruction optimization determines which of the two opcodes is appropriate—the decision based on the original first instruction and the original second instruction that the fused instruction represents.

Referring again to FIG. 4, in conditional block 610, it is determined if the destination operand of the first instruction is a source operand in the first position of the second instruction (i.e., if the first instruction is "add r1, r2, t1" and the second instruction is "sub t1, r4, dst", then the destination operand of the first instruction ("t1") is in the first source position of the second instruction). If the destination operand of the first instruction is not a source operand in the first position of the second instruction, then in block 620, a fused opcode is found that represents both the opcode of the first instruction and the opcode of the second instruction, and which will swap the source operands before performing the operation of the second instruction (e.g., if the first instruction is "add r1, r2, t1" and the second instruction is "sub r4, t1, dst", then the fused instruction is "add & sub r1, r2, r4, dst", but when executing this fused instruction, the result of "add r1, r2" is subtracted from r4 because the source operands are swapped before performing the subtract operation).

If the destination operand of the first instruction is a source operand in the first position of the second instruction, then in block 615, a fused opcode is found that represents both the opcode of the first instruction and the opcode of the second instruction (in this case, the source operands do not need to be swapped before performing the second operation). In block 625, the source operands of the fused instruction are found. The source operands of the fused instruction are the first source operand and the second source operand of the first instruction and the source operand of the second instruction that is not the destination operand of the first instruction. In block 630, the destination operand of the fused instruction is found by using the destination operand of the second instruction. At this point, the fused instruction that replaces the two simple dependent instructions is formed and has three source operands and one destination operand.

As stated earlier, the clock cycle determines how quickly the processor can execute instructions. The length of the clock cycle is set so that the slowest instruction can finish executing within the clock cycle. Because the clock cycle is tailored to the slowest instruction, many of the instructions finish executing its operation long before completion of the clock cycle. In order to improve processor performance, a specialized execution unit can be used to execute two operations within one clock cycle, as described in greater detail below.

Modern processors generally execute instructions out-of-order. A decode unit translates macro instructions (e.g., the IA-32 instruction set) to micro operations ("uops"). The uops are simple instructions and are more amenable to out-of-order execution by the execution units. When the decode unit decodes a fused instruction, the fused instruction is separated into one or two different uops (each of the two uops represents one of the two operations of the fused instruction). Because the fused instruction includes two operations and one operation is dependent on the result of another operation, executing the fused instruction may take two clock cycles. If a specialized execution unit is available that has two arithmetic logic units ("ALUs")—one that can process the first operation and the other that can process the second operation of the fused instruction, then the two operations of the fused instruction can be executed in one clock cycle.

Figure 5:
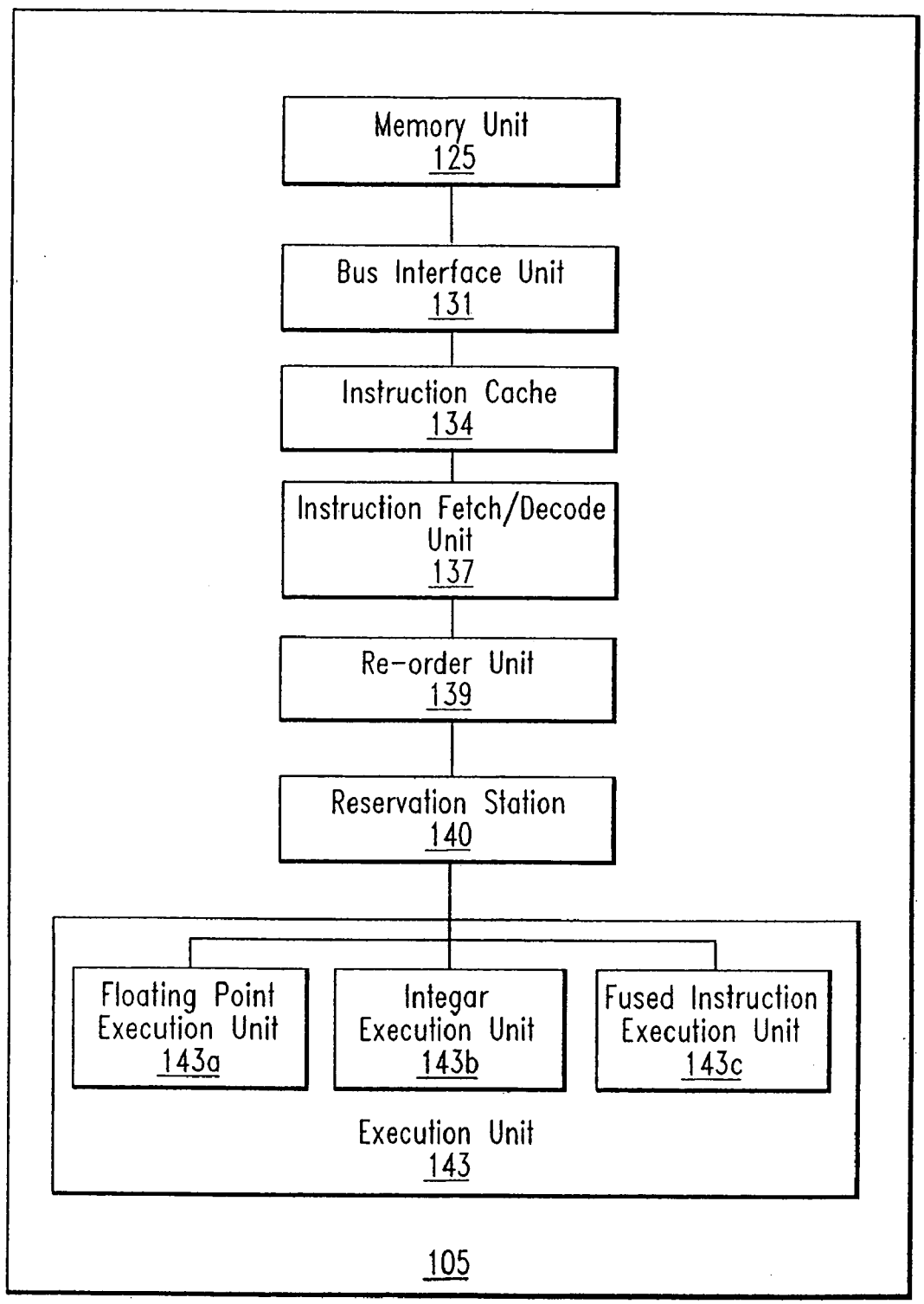
FIG. 5 shows a block diagram of a processor according to one embodiment of the present invention.

FIG. 5 shows a block diagram of a processor 105 according to one embodiment of the present invention. Processor 105 includes a bus interface unit 131 that accesses information stored on memory unit 125. Memory unit 125 may be main memory (e.g., random access memory), or cache memory. Instructions are initially fetched from memory unit 125 into an instruction cache 134. Instruction cache 134 is a high-speed cache memory for storing commonly or recently accessed instructions. An instruction fetch/decode unit 137 is coupled to instruction cache 134. Instruction fetch/decode unit 137 fetches an instruction from instruction cache 134 and decodes (translates) the macro instruction into one or more uops. This translation is performed such that the uops are more amenable to out-of-order execution than the macro instruction. Upon encountering the fused instruction, that instruction may be decoded into one or two uops. If instruction fetch/decode unit 137 encounters a fused instruction and a specialized execution unit is available to process the fused instruction in one clock cycle, then instruction fetch/decode unit 137 tags the fused instruction (i.e., tags the one or two uops of the fused instruction) so that it's dispatched by a reservation station 140 to the specialized execution unit.

A re-order unit 139 is coupled to instruction fetch/decode unit 137. Re-order unit 139 stores uops and these uops are fetched by reservation station 140 in any order (the order that the uops are fetched may be out-of-order) and sent to an appropriate execution unit. Reservation station 140 is coupled to re-order unit 139. Reservation station 140 schedules and dispatches uops from re-order unit 139 to execution units 143a-c. Reservation station 140 continuously scans re-order buffer 139 for uops that are ready to be executed and dispatches them to an available execution unit. If reservation station 140 finds a fused instruction (i.e., the one uop or the two uops representing the fused instruction that have been tagged for execution together) and a specialized execution unit exists to process the fused instruction in one clock cycle, then the fused instruction is dispatched to the specialized execution unit. Execution unit 143 executes logical and arithmetic instructions as well as other well known execution functions. Execution unit 143 includes, among other units, a floating point execution unit 143a, an integer execution unit 143b, and a fused instruction execution unit 143c. Fused instruction execution unit 143c is a specialized execution unit that can execute in one clock cycle the two operations of the fused instruction.

Figure 6:
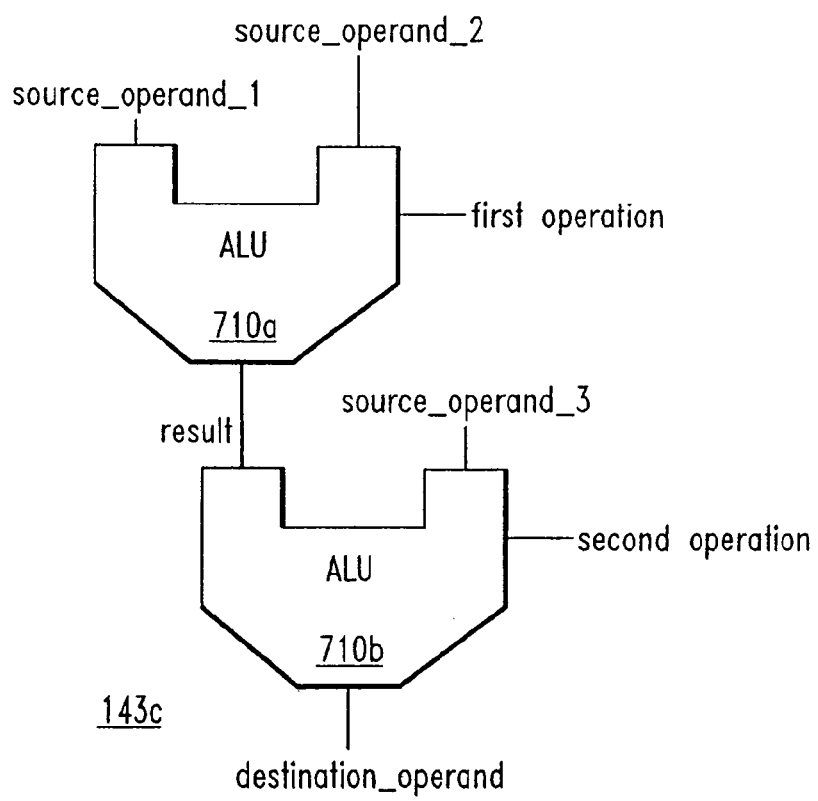
FIG. 6 shows a block diagram of a fused instruction execution unit according to one embodiment of the present invention.

FIG. 6 shows a block diagram of fused instruction execution unit 143c according to one embodiment of the present invention. Fused instruction execution unit 143c executes in one clock cycle the two operations of the fused instruction. Fused instruction execution unit 143c includes ALU 710a and ALU 710b. ALU 710a and ALU 710b perform processor 105's data processing functions. ALU 710a performs a first operation which may be, for example, an ADD operation. ALU 710b performs a second operation which may be, for example, an AND operation. The inputs to ALU 710a, source_operand_1 and source_operand_2, are the source operands of the first operation. The result of the first operation from ALU 710a is input into ALU 710b. The other input into ALU 710b, source_operand_3, is the source operand of the second operation that is not the destination operand of the first operation. The result of the second operation output from ALU 710b is stored in the destination operand of the second uop, destination_operand.

As an example, assume that the fused instruction is: add&sub r1, r2, r3, r4. The inputs to ALU 710a, source_operand_1 and source_operand_2, equal r1 and r2 respectively. The first operation is the ADD operation and the result of adding r1 and r2 is input into ALU 710b. The other input into ALU 710b, source_operand_3, is r3. The second operation is the SUB operation and the result of subtracting r3 from the result of ALU 710a is stored in the destination_operand of ALU 710b, r4 (for this example, assume that ALU 710b subtracts source_operand_3 from the result of the first operation).

Although embodiments are specifically illustrated and described herein, it will be appreciated that modifications and variations of the present invention are covered by the above teachings and within the purview of the appended claims without departing from the spirit and intended scope of the invention.

What is claimed is:

1. A method for optimizing a number of instructions in a program file, comprising:
   finding a first instruction and a second instruction in the program file that each perform a single operation and the second instruction depends on a result of the first instruction; and
   forming a fused instruction that includes
      determining a fused opcode that represents both a first operation of the first instruction and a second operation of the second instruction.

2. The method of claim 1, wherein the second instruction depends on the result of the first instruction if a destination operand of the first instruction is at least one source operand of the second instruction.

3. The method of claim 1, further comprising:
   replacing the first instruction and the second instruction with the fused instruction in the program file after the fused instruction is formed.

4. The method of claim 1, wherein forming the fused instruction includes
   combining at least one source operand of the first instruction and the at least one source operand of the second instruction that is not the destination operand of the first instruction to form a plurality of source operands of the fused instruction; and
   setting a destination operand of the fused instruction to a destination operand of the second instruction.

5. The method of claim 4, wherein the first instruction has two source operands and the second instruction has two source operands, and the two source operands of the first instruction are combined with a particular one of the two source operands of the second instruction that is not the destination operand of the first instruction to form three source operands of the fused instruction.

6. The method of claim 1, wherein the fused opcode is specified using M*N bits and the fused opcode represents one of $2^M$ first operations fused with $2^{(M*N-M)}$ second operations.

7. The method of claim 5, wherein each of the three source operands of the fused instruction and the destination operand of the fused instruction are specified using a number of bits needed to address available registers.

8. A computer storage device containing a fused instruction, said fused instruction comprising:
   a fused opcode that represents both a first operation of a first instruction and a second operation of a second instruction where the first instruction and the second instruction each perform a single operation and the second instruction depends on a result of the first instruction.

9. The computer storage device of claim 8, wherein the second instruction depends on the result of the first instruction if a destination operand of the first instruction is at least one source operand of the second instruction.

10. The computer storage device of claim 9, wherein the fused opcode swaps the order of applying a temporary operand, that stores the result of the first instruction, to the at least one source operand of the second instruction that is not the destination operand of the first instruction, if the second instruction is non-commutative and swaps the order of applying a first one of the at least one source operand of the second instruction to a second one of the at least one source operand of the second instruction.

11. The computer storage device of claim 9, further comprising:
   a plurality of source operands formed by combining at least one source operand of the first instruction and the at least one source operand of the second instruction that is not the destination operand of the first instruction; and
   a destination operand that is a destination operand of the second instruction.

12. The computer storage device of claim 11, wherein the plurality of source operands are three source operands that are formed by combining two source operands of the first instruction and a particular one of two source operands of the second instruction that is not the destination operand of the first instruction.

13. The computer storage device of claim 8, wherein the fused opcode is specified using M*N bits and the fused opcode represents one of $2^M$ first operations fused with $2^{(M*N-M)}$ second operations.

14. The computer storage device of claim 11, wherein each of the three source operands of the fused instruction and the destination operand of the fused instruction are specified using a number of bits needed to address available registers.

15. The computer storage device of claim 11, wherein the fused opcode is specified using eight bits and each of the three source operands of the fused instruction and the destination operand of the fused instruction is specified using five bits.

16. A computer storage device containing a compiler, said compiler comprising:
   a fused instruction generator that
      finds a first instruction and a second instruction in a program file that each perform a single operation and the second instruction depends on a result of the first instruction; and
      forms a fused instruction that includes
         a fused opcode that represents both a first operation of the first instruction and a second operation of the second instruction.

17. The computer storage device of claim 16, wherein the second instruction depends on the result of the first instruction if a destination operand of the first instruction is at least one source operand of the second instruction.

18. The computer storage device of claim 16, wherein the fused instruction generator replaces the first instruction and the second instruction with the fused instruction in the program file after forming the fused instruction.

19. The computer storage device of claim 17, wherein the fused opcode swaps the order of applying a temporary operand, that stores the result of the first instruction, to the at least one source operand of the second instruction that is not the destination operand of the first instruction, if the second instruction is non-commutative and swaps the order of applying a first one of the at least one source operand of the second instruction to a second one of the at least one source operand of the second instruction.

20. The computer storage device of claim 16, wherein the formed fused instruction includes
   a plurality of source operands formed by combining at least one source operand of the first instruction and the at least one source operand of the second instruction that is not the destination operand of the first instruction; and a destination operand that is a destination operand of the second instruction.

21. The computer storage device of claim 20, wherein the plurality of source operands are three source operands that are the two source operands of the first instruction and a particular one of the two source operands of the second instruction that is not the destination operand of the first instruction.

22. A computer storage device embedded in a processor, comprising:

a fused instruction execution unit that includes a first arithmetic logic unit (ALU) to perform a first operation and a second ALU to perform a second operation, wherein a result of the first ALU is input into the second ALU and within one clock cycle, the first ALU performs the first operation and the second ALU performs the second operation.

23. The computer storage device of claim 22, further comprising:

an instruction fetch/decode unit that tags a fused instruction for execution on the fused instruction execution unit, if the first ALU performs a first operation of the fused instruction and the second ALU performs a second operation of the fused instruction; and a re-order unit, coupled to the instruction fetch/decode unit, that stores the fused instruction for retrieval by a reservation station.

24. The computer storage device of claim 23, further comprising the reservation station, coupled to the re-order unit and the fused instruction execution unit, that retrieves the fused instruction and dispatches the fused instruction to the fused instruction execution unit, if the first operation of the first ALU matches the first operation of the fused instruction and the second operation of the second ALU matches the second operation of the fused instruction.

25. A method for executing a fused instruction within one clock cycle, comprising:

performing a first operation in a first arithmetic logic unit (ALU) of a fused instruction execution unit and a second operation in a second ALU of the fused instruction execution unit, wherein a result of the first ALU is input into the second ALU and within one clock cycle, the first ALU performs the first operation and the second ALU performs the second operation.

26. The method of claim 25, further comprising:

dispatching the fused instruction to the fused instruction execution unit if the first operation of the first ALU matches a first operation of the fused instruction and the second operation of the second ALU equals a second operation of the fused instruction.

27. A computer storage device having stored thereon data representing sequences of instructions, the sequences of instructions including sequence of instructions which, when executed by a processor, cause the processor to perform the steps of:

finding a first instruction and a second instruction in the program file that each perform a single operation and the second instruction depends on a result of the first instruction; and forming a fused instruction that includes determining a fused opcode that represents both a first operation of the first instruction and a second operation of the second instruction.

28. The computer storage device of claim 27, wherein the second instruction depends on the result of the first instruction if a destination operand of the first instruction is at least one source operand of the second instruction.

* * * * *